United States Patent [19]

Mullhaupt

[11] 3,980,763
[45] Sept. 14, 1976

[54] PROCESS AND COMPOSITION FOR SEPARATION OF OXYGEN FROM AIR USING Pr-Ce OXIDES AS THE CARRIER

[75] Inventor: Joseph Timothy Mullhaupt, Waldwick, N.J.

[73] Assignee: Union Carbide Corporation, New York, N.Y.

[22] Filed: Oct. 25, 1973

[21] Appl. No.: 409,604

[52] U.S. Cl. .............................. 423/579; 252/462; 423/219
[51] Int. Cl.² .................. C01B 13/00; B01J 23/10
[58] Field of Search ................. 423/579, 21, 219; 252/462

[56] References Cited
UNITED STATES PATENTS

| | | | |
|---|---|---|---|
| 3,049,403 | 8/1962 | Krumholz | 423/21 |
| 3,579,292 | 5/1971 | Mullhaupt et al. | 423/579 |

OTHER PUBLICATIONS

Faeth et al., "Praseodymium Oxide–Oxygen Generator," Journal of Chemical Education, vol. 40, 1963, pp. 150, 151.

Moriarty, Jr.: The Effects of Catalytic or Promoter Oxides on the Brin Process, Iowa Academy of Sciences, Proceedings, vol. 77, 4/10/71, pp. 360–378.

Mellor: Comprehensive Treatise on Inorganic & Theoretical Chemistry, vol. 5(1924), p. 546.

Primary Examiner—Oscar R. Vertiz
Assistant Examiner—Wayne A. Langel
Attorney, Agent, or Firm—Saul R. Bresch

[57] ABSTRACT

Oxide solid solutions of praseodymium and cerium are useful as the oxygen carrier in a reversible cyclic oxidation-reduction process for separating oxygen from air. The adverse affects on redox rates of contaminants in the air, such as $CO_2$ and/or $H_2O$ are substantially eliminated by incorporating a surface dopant such as silver into the praseodymium-cerium oxide.

11 Claims, 3 Drawing Figures

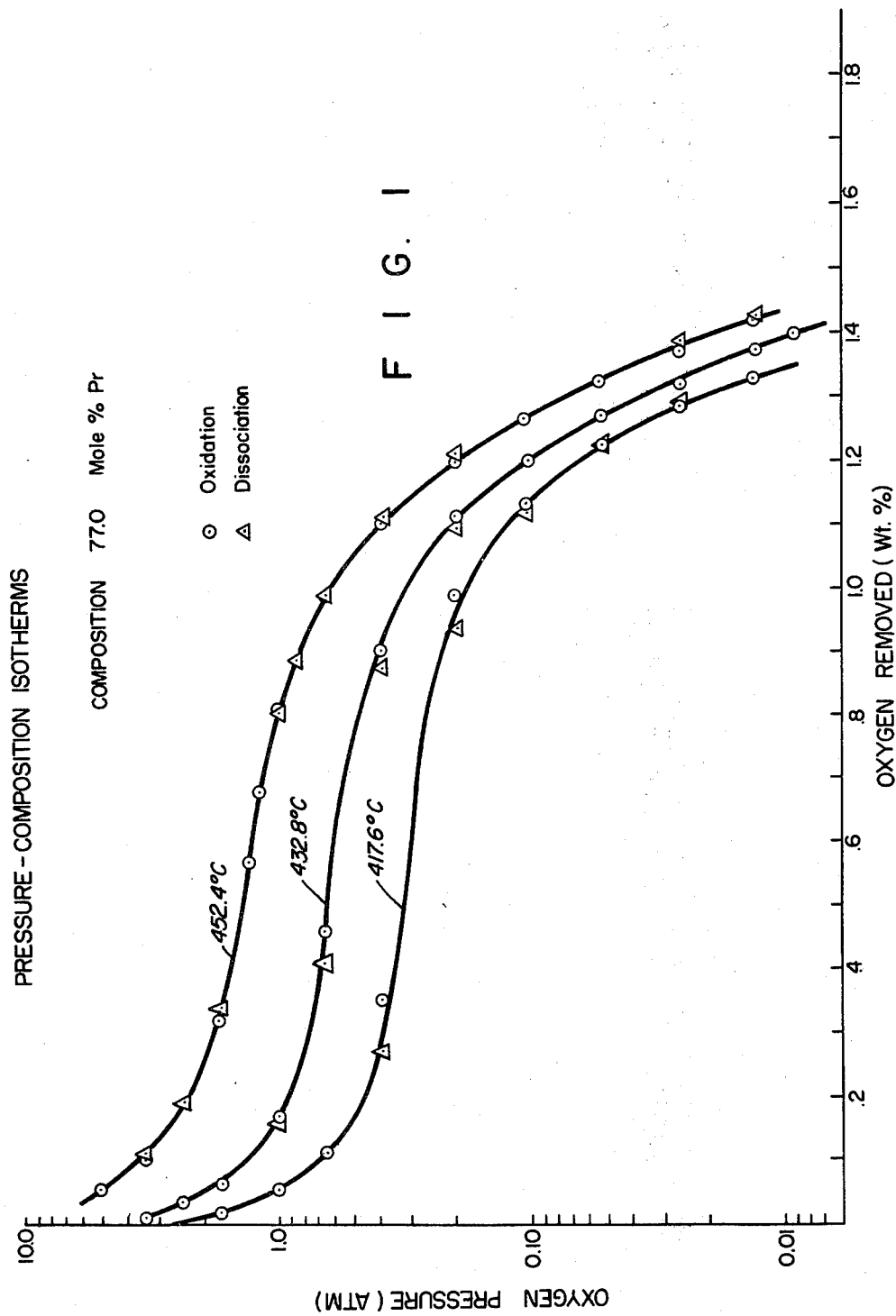

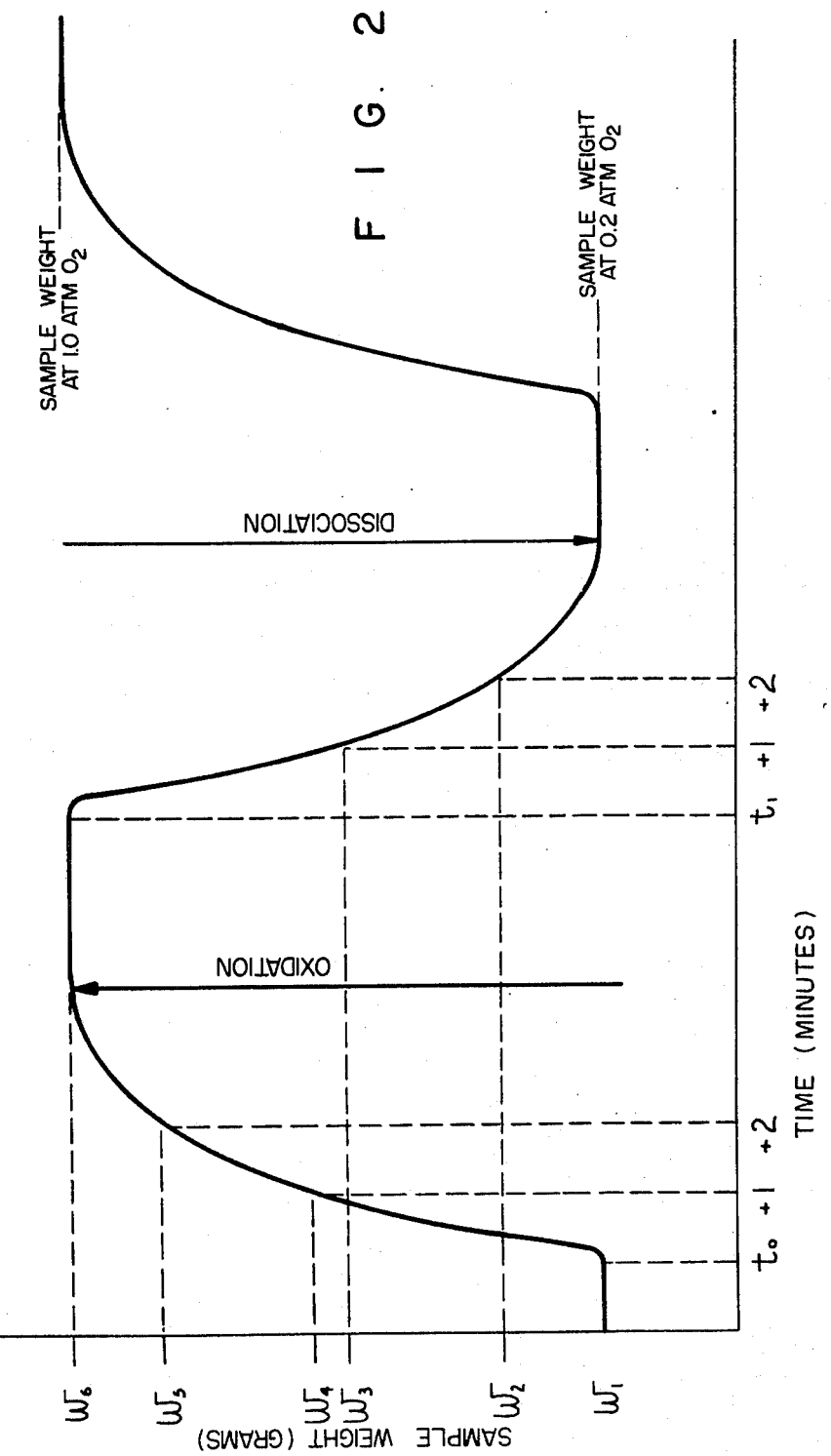

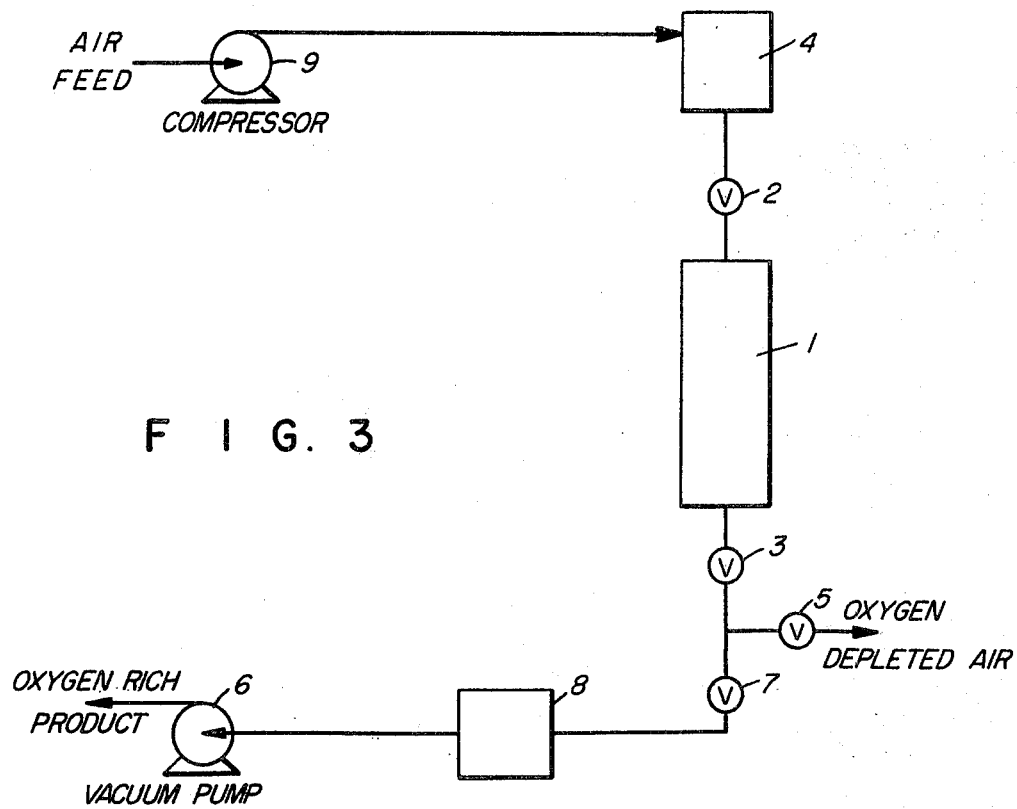

PROCESS AND COMPOSITION FOR SEPARATION OF OXYGEN FROM AIR USING PR-CE OXIDES AS THE CARRIER

BACKGROUND

The present invention relates to a method of separating oxygen from air, an oxygen exchange material useful therefor, and to a method for preparing said material. More particularly, the invention relates to praseodymium-cerium oxide materials which are useful in air separation processes and to a method of preparing said oxide materials.

The increasing industrial demand for pure oxygen has focused scientific attention on chemical techniques for separating oxygen from nitrogen and the other gases found in admixture in the atmosphere. Among the known physical methods of air separation, fractionation of liquefied air is by far the most widely used commercial process.

Chemical processes which have been investigated are, for the most part, predicated on the ability of certain chemical compounds or elements to undergo a reversible chemical reaction with oxygen such that they selectively combine with oxygen in the atmosphere under one set of operating conditions (i.e. temperature and pressure) and thereafter are decomposed under a different set of conditions to yield oxygen and the original reactant. Numerous methods of cycling the oxygen carrier material have been considered. It has been proposed, for example, that the chemical reaction mass be in the form of a fixed bed with the gaseous atmosphere in contact therewith being cycled by pressure and/or temperature swings. Alternatively, it has been suggested that the reaction mass be moved continuously through absorption and desorption zones using conventional fluidized bed techniques.

Although conceptually attractive, the use of reversible chemical reaction masses for air separation has not proven commercially feasible for reasons varying with the particular reaction mass studied. Three well-known processes — the Mallet process, the Brin process and the duMotay process — are reviewed in U.S. Pat. No. 3,579,292 directed to a chemical air separation process characterized by the reversible reaction of strontium oxide with oxygen to form strontium peroxide.

In general, there are thee principal requirements to be met before a chemical process for manufacturing oxygen can be considered practical from a commercial standpoint. These are: (1) a reaction mass having a reversible chemical equilibrium with oxygen at reasonably low operating temperatures and at convenient pressures, e.g., oxygen equilibrium pressures greater than about 0.2 atm. below about 500°C, (2) usable oxygen loadings and fast intrinsic kinetics so that relatively rapid reaction rates are attainable at practical driving forces, and (3) chemical and physical stability such that: (a) competing side reactions are absent, (b) reaction rates are invariant with time, especially during repeated cycling, (c) the reaction mass is relatively inert to air contaminants such as $CO_2$ and $H_2O$, and (d) the material can be handled and used without undue losses from attrition, sintering or vaporization, for example.

Praseodymium oxides have been suggested in the art as oxygen exchange materials for an air separation process. In an article in the Journal of Chemical Education (Vol. 40, 1963, p. 150) P. A. Faeth and A. F. Clifford, proposed the use of a Pr-O system for generating oxygen to take advantage of the relative ease with which oxygen can be removed from and combined with oxides of praseodymium. Unfortunately, however, the operating conditions which are required for generating oxygen are so impractical as to preclude any serious interest in praseodymium oxide as commercially feasible chemical reaction materials. For example, the equilibrium pressure of $O_2$ is stated to be no greater than 160 mm at temperatures below 900°C. Thus, if the reaction were carried out on a commercial scale, the extremely high operating temperatures would necessitate relatively expensive heat resistant reactors and flow equipment. Furthermore, a maximum oxygen pressure of 160 mm would necessitate vacuum pumping during the dissociation cycle followed by an inordinate amount of gas compression in order to deliver the generated oxygen at a practical operating pressure. Moreover, the temperature swing of about 450°C which was effected to cycle the praseodymium oxide reactant from an oxidized phase to a reduced phase would be economically prohibitive in terms of continuously heating and cooling a large mass of material over a temperature range of several hundred degrees.

OBJECTS

Accordingly, it is an object of this invention to provide a commercially feasible process for separating oxygen from an oxygen-containing gas mixture characterized by a chemical reaction mass having a highly reversible equilibrium with oxygen and a relatively large oxygen loading (i.e. above 0.5 wt.-%) at temperatures below 500°C.

It is another object of this invention to provide a process for separating oxygen from an oxygen-containing gas mixture wherein the chemical reaction mass has relatively rapid oxidation and dissociation rates which are substantially unaffected by the presence of $CO_2$ and/or $H_2O$ in said oxygen-containing mixture.

It is another object of this invention to provide novel oxides of praseodymium and cerium which are suitable for use in the above-described separation process.

It is still another object of this invention to provide a process for preparing the aforesaid novel oxides of praseodymium and cerium.

SUMMARY

These and other objects which will be apparent from the specification and claims, are accomplished in accordance with the present invention, one aspect of which relates to a process for separating oxygen from an oxygen-containing gas mixture comprising the steps of:

1. oxidizing a reaction mass comprising a praseodymium cerium oxide in a dissociated state by contacting it with said oxygen-containing gas mixture thereby converting at least a portion of said reaction mass to a relatively more oxidized state, 2. separating the oxidized reaction mass from the oxygen-depleted gas mixture, 3. dissociating at least a portion of said oxidized reaction mass to form a relatively more reduced state of Pr-Ce oxide, thereby liberating oxygen, and 4. separating said liberated oxygen from said reduced state of Pr-Ce oxide.

The reactant materials defined by the present invention comprise a wide range of non-stoichiometric oxide solid solutions having the general chemical formula:

$$(Pr_xCe_y)O_z \quad (1)$$

where:

x and y define the relative molar amounts of cations (Pr and Ce) in the oxide materials, the sum of x and y being 1.0, and z varies from 1.5 to 2.0.

At $z = 2.0$ the oxide materials are in their fully oxidized state, while at $z = 1.5$, the oxides are at their lower limit of dissociation corresponding to the well-known sesquioxide phases of the lanthanide elements such as, $Pr_2O_3$. The general formula shown in equation (1) can be used to characterize the state of oxidation of the total reaction mass. The state of oxidation describes the oxygen content of the mass. It can be changed by oxidizing part of the reactant mass thereby increasing the value of z, or by dissociating part of the reaction mass thereby decreasing the value of z. The terms "dissociation" and "reduction" are used interchangeably throughout the specification and claims.

It will, of course, be apparent to those skilled in the art that the terms "oxidized" and dissociated are relative. That is, one state of a given mass may be considered dissociated with regard to a second state having a higher value of z, and oxidized with regard to a third state having a lower value of z. Thus, for example, an oxide material having the general formula shown in equation (1) and having a value of z equal to 1.8 would be in a reduced state if the reactant were cycled between values of z equal to 1.8 and 1.9. Yet, it would be considered oxidized if the oxide were cycled between values of z equal to 1.8 and 1.7.

The term "mole % Pr" as used herein with reference to the oxide materials is on an oxygen-free basis. That is, it is defined as moles of Pr/(moles of Pr + moles of Ce).

The air separation process of the present invention can be characterized by the reversible reaction:

$$(Pr_xCe_y)O_z + (1-(z/2)) O_2 \rightleftharpoons (Pr_xCe_y) O_{2.0} \quad (2)$$

where:

x, y and z are as defined above.

In practice, the value of z need not vary from 1.5 to 2.0 to be useful. Smaller variations, such as from about 1.88 to 1.98, are more practical because of the thermodynamic properties of these materials.

As a practical matter, the molar ratio of Pr to Ce in the oxide material may be varied over a wide range for purposes of air separation. Moreover, depending upon the particular mole ratio of Pr, each reactant is characterized by unique thermodynamic and kinetic properties. Hence, the choice of a chemical reactant for a given air separation process will generally be governed by process requirements.

Another aspect of the present invention relates to novel reaction masses comprising oxides of praseodymium and cerium containing minor amounts of a surface dopant.

While chemical air separation may be effectively carried out using a Pr-Ce oxide material such as described hereinabove, the inclusion of a surface dopant, such as, silver ion (e.g. 0.4 wt.-%) unexpectedly increases the resistance of the oxide material to the effects of $CO_2$ and $H_2O$. Thus, the relatively large decrease in oxidation and reduction rates which are generally observed with chemical reactants (including Pr-Ce oxides) in the presence of $CO_2$ and $H_2O$, is substantially avoided with silver doping. The doped reactant materials are therefore well suited for long-term cyclical operations with atmospheric air or other oxygen-containing gas mixture containing appreciable amounts of $CO_2$ and $H_2O$.

A third aspect of the present invention relates to a method of preparing the aforesaid reaction masses comprising the steps of:

1. contacting (a) an aqueous solution containing the nitrate salts of Pr, Ce and a dopant species selected from the group consisting of silver, vanadium, manganese, copper, molybdenum, tungsten, platinum, thallium, lead and bismuth, and (b) a greater than stoichiometric amount of precipitating reagent relative to the molar amount of Pr and Ce in said aqueous solution, said precipitating reagent being selected from the group consisting of ammonium carbonate, ammonium oxalate, ammonium hydroxide and oxalic acid, thereby forming a precipitate, 2. separating the precipitated material from step (1) from said aqueous solution, 3. drying the precipitated material, and 4. calcining said precipitated material at a temperature of from about 600°–1000°C to decompose the precipitated compound and form an oxide of praseodymium and cerium containing a dopant.

The term "calcining" as used herein refers to firing or heating the precipitate in air, preferably at a temperature of from about 800°–900°C.

DRAWINGS

FIG. 1 is illustrative of pressure-composition isotherms for oxides of praseodymium and cerium, in general, and for an oxide reactant containing 77.0 mole % Pr, in particular.

FIG. 2 is a graph illustrating the weight change of a reaction mass vs. time during a typical oxidation and dissociation cycle in an isothermal pressure swing process.

FIG. 3 is a schematic flow diagram showing operation of an air separation process for producing oxygen in accordance with the present invention.

DETAILED DESCRIPTION

The process of the present invention is predicated on the use of a highly reversible oxide system as a chemical reaction material effective for oxygen exchange. The Pr-Ce oxides comprise a set of reactant materials for air separation corresponding to compositions in the range 33–92 mole % Pr. These oxides exist as non-stoichiometric solid solutions of praseodymium and cerium. Two cubic fluorite-type crystal structures have been identified by x-ray diffraction at ambient conditions corresponding to oxidized and dissociated phases in the as-prepared materials. These structures are analagous to those of the oxidized and reduced phases of pure praseodymium having the general formulae: $PrO_2$ and $Pr_6O_{11}$ (i.e. $PrO_{1.83}$), respectively. A reaction mass may contain one or both of these phases, depending on the state of oxidation.

A discussion of the usefulness of Pr-Ce oxides for chemical air separation must necessarily focus on thermodynamic data (i.e. equilibria with oxygen at conditions of interest) and kinetic measurements (i.e. rates of "redox" reactions). In essence, thermodynamic measurements characterize the response of a chemical reaction mass in equilibrium with oxygen to changes in temperature and pressure, i.e. the extent to which oxidation or dissociation will occur. Kinetic measurements, determine the rate at which said oxidation and dissociation reactions occur before a stable condition is reached.

EQUILIBRIUM MEASUREMENTS

The equilibria of Pr-Ce oxides with oxygen in the pressure range 0.01–10.0 atmospheres and at temperatures in the range 360°–710°C were investigated principally by means of pressure - composition isotherms. Typical isotherms are shown in FIG. 1 for a Pr-Ce oxide containing 77.0 mole % Pr. Reference to FIG. 1 shows an isotherm to be a measure of the equilibrium pressure of oxygen as a function of the oxygen content of the reaction mass at constant temperature. Because the oxygen content is a function of pressure at a fixed temperature, both the initial and final pressures for either oxidation or dissociation must be specified to determine the extent of reaction, or "oxygen loading." Oxygen loading is defined as the total amount of oxygen which is added to or removed from the reaction mass during the respective oxidation or dissociation reactions (expressed, for purposes of convenience, as wt.-% of the fully oxidized material). Thus, for example, for the material of FIG. 1, an oxygen loading of 0.94 wt.-% is obtained at 432.0°C between the oxygen pressure 0.2 and 1.0 atm.

The shapes of the equilibrium pressure — oxygen content isotherms are characteristic of a bivariant system comprising two non-stoichiometric solid phases. In contrast thereto, the corresponding isotherms for two formally stoichiometric solid phases in a univariant system, such as $SrO_2 - SrO - O_2$, exhibit flat regions where the equilibrium oxygen pressure is a function of temperature only.

A recording thermobalance was used to obtain the equilibrium data for the pressure-composition isotherms. The thermobalance is essentially a chamber wherein a sample is placed in contact with a gaseous atmosphere at a controlled pressure and temperature. The weight of the sample is then continuously recorded as the pressure of the gas is varied over a predetermined range until the isotherm is mapped.

More specifically, the operating procedure consisted of placing the sample to be studied in the balance chamber of the thermobalance which was then evacuated (to a pressure less than 0.1 torr) to remove any adsorbed gases or vapors and heated to the temperature range of interest. When the desired temperature was reached, oxygen was admitted at a known pressure and the system allowed to come to constant weight. This procedure was repeated step-wise over the pressure range to be studied using pressure increases as well as decreases. The sample was considered fully oxidized when no further weight increase was observed with increasing oxygen pressure. The weight of the fully oxidized sample was then used as the reference point for calculating oxygen loading.

The chemical reversibility of the Pr-Ce oxide reactants with oxygen is evident from the isotherms illustrated in FIG. 1. That is, the equilibrium data points obtained during the dissociation and oxidation reactions coincide, for the most part, on the same curve. This is important insofar as a commercially feasible chemical reactant is concerned since it facilitates its use in a cyclical air-separation process. Thus, oxygen generation can be accomplished by alternately oxidizing and dissociating the reaction mass in a pressure swing cycle while maintaining the reaction mass at a fixed temperature. Referring to FIG. 1, for example, if a pressure cycle of 0.2 to 1.0 atmosphere is chosen as the desired operating range, and the reaction temperature is maintained at 432.0°C, oxygen would be generated during each cycle in an amount corresponding to a loading of 0.94 wt.-%; oxygen being liberated during dissociation at a pressure of 0.2 atmospheres and charged during the oxidation cycle at a pressure of 1.0 atmospheres. It should be noted, by way of comparison, that the reactions of the oxides of pure praseodymium are much less readily reversible. Published thermogravimetric data for oxides of pure praseodymium (see, B. G. Hyde, D. J. M. Bevan and L. Eyring, Phil. Trans. Royal Soc. (London) A 259 (1966) p. 583) exhibit inordinately large hysteresis effects which would effectively preclude their use in a commercially acceptable air separation process.

Equilibrium data for the range of compositions studied is partially summarized in Table I below which illustrates the effect of composition on oxygen loading and isotherm temperature. Specifically, to represent each composition studied, the experimental isotherm was selected for which the oxygen loading was at its maximum for the pre-selected pressure range of 0.2 to 1.0 atmosphere, a pressure range of commercial interest. In other words, the isotherm having the largest change in oxygen content for the smallest change in pressure within the specified pressure range was chosen, for each composition, as the optimum operating temperature from the standpoint of equilibrium. Thus, for example, referring to the isotherms shown in FIG. 1, the oxygen loading for an oxide containing 77.0 mole % Pr is at a maximum at an isotherm temperature of 432.0°C; the oxygen loading being calculated from the curve to be 0.94 wt.-%, namely, the difference between 1.10 wt.-% (at 0.2 atm.) and 0.16 wt.-% (at 1.0 atm.).

As shown in Table I, the oxygen loading increases with increasing concentration of Pr in the oxide. The corresponding isotherm temperature, however, decreases with increasing Pr concentrations. Thus, there is a trade-off of oxygen loading versus reaction kinetics. That is, an increase in oxygen loading can only be achieved at the expense of a lower isotherm temperature, conditions which do not favor the kinetics of the redox reactions. The range of compositions 67–92 mole % Pr is particularly preferred insofar as chemical equilibrium is concerned because it corresponds to commercially useful oxygen loadings of greater than 0.5 wt.-% at a practical pressure range of 0.2 to 1.0 atm.

TABLE I

Changes in Maximum Oxygen Loading with Composition at $O_2$ Pressure Range 0.2–1.0 atm.

| Sample No. | Pr/(Pr + Ce) (mole-%) | Maximum $O_2$ Loading (wt. -%) | Isotherm Temperature (°C) |
|---|---|---|---|
| A | 33.8 | 0.18 | 606 |
| B | 46.8 | 0.30 | 552 |
| C | 54.4 | 0.33 | 499.0 |
| D | 67.7 | 0.49 | 451.3 |
| E | 73.5 | 0.79 | 437.2 |
| F | 77.0 | 0.94 | 432.0 |
| G | 77.5 | 0.94 | 434.2 |
| H | 79.4 | 0.97 | 427 |
| I | 80.2 | 0.98 | 416.6 |

TABLE I-continued

Changes in Maximum Oxygen Loading with Composition at $O_2$ Pressure Range 0.2–1.0 atm.

| Sample No. | Pr/(Pr + Ce) (mole-%) | Maximum $O_2$ Loading (wt. -%) | Isotherm Temperature (°C) |
|---|---|---|---|
| J | 89.6 | 1.14 | 380 |

REACTION RATES

The rates of oxygen uptake and release (redox rates) were measured to determine how much of the equilibrium oxygen loading is accessible within practical operating times, and to determine the chemical stability of the oxide materials as shown by the invariance in redox rates with time and by the resistance to the effects of contaminants such as $CO_2$ and/or $H_2O$. To facilitate comparision of data for different test samples and process variables, redox data are presented herein in tabular form. The rates of reaction were obtained from experimental records of sample weight as a function of time measured at a fixed temperature between the test pressures of 0.2 and 1.0 atm. To characterize the oxidation and dissociation reactions, oxygen loadings were determined from these records at three distinct times in the course of reaction. Accordingly, the full range and the loadings after the first and second minute of reaction are used as figures of merit for comparing samples; the full range being the loading observed at the completion of the oxidation or reduction reaction, namely, the oxygen loading at equilibrium conditions.

The measurement of reaction rates as discussed herein can best be understood with reference to FIG. 2 which shows a typical curve plotting the weight of a reaction mass versus time in an isothermal pressure swing cycle wherein the oxidation and dissociation reactions are allowed to go to completion. The weight of the dissociated sample at an $O_2$ pressure of 0.2 atm. is $w_1$. The oxidation reaction is initiated at time $t_0$ corresponding to a change of oxygen pressure from 0.2 to 1.0 atm. The reaction is complete when constant weight $w_6$ is achieved at equilibrium conditions. Dissociation is initiated at time $t_1$ by rapidly adjusting the oxygen pressure from 1.0 atm. to 0.2 atm., thereby liberating oxygen from the reaction mass. The reaction is complete after constant weight $w_1$ is achieved. Thus, for a reversible system, the weight of the reaction mass will be continuously cycled between $w_1$ and $w_6$.

The oxygen loadings used to characterize the redox data can be defined in terms of the variables illustrated in FIG. 2. In the following definitions, the weight of the sample in the fully oxidized state is denoted by W.

The full reactive range for the standard test pressures is defined as $[100(w_6 - w_1)]/W$, and has the units of weight percent.

For oxidation:

oxygen loading after 1st minute (OL1) = $[100(w_4 - w_1)]/W$, oxygen loading after 2nd minute (OL2) = $[100(w_5 - w_1)]/W$.

For dissociation:

OL1 = $[100(w_6 - w_3)]/W$,

OL2 = $[100(w_6 - w_2)]/W$.

Comparisons of OL1 and OL2 with the full reactive range show the extent to which the initial reaction rate (OL1) has been sustained during the second minute of reaction, and the fraction of the reactants full range which can be utilized in a relatively short process cycle of one or two minutes. Stated otherwise, the redox data provides a measure of the rate at which the overall system approaches equilibrium.

The long-term stability of the oxide materials of the present invention was measured by isothermally cycling a sample reactant with various combinations of $O_2$, $H_2O$ and $CO_2$ for hundreds of hours. The cycle conditions were: oxidation at 1.0 atm. oxygen pressure for 2.5 minutes, dissociation at 0.2 atm. oxygen pressure for 2.5 minutes. The difference in sample weights at the ends of the 2.5 minute periods yields the oxygen loading that is a measure of the rates for the imposed cycle times. These oxygen loadings were measured periodically throughout the run and are shown in Table II below as a function of cycling time; the particular composition of the gas phase being indicated for each time interval. Since the full reactive range is unaffected by contaminants (i.e. $CO_2$ and $H_2O$) in the gas phase, the $O_2$ loadings measured after 2.5 minutes provide a measure of the effect of $CO_2$ and $H_2O$ on the reaction rate, rather than the equilibrium, of the test sample.

The data in Table II demonstrate the excellent stability of redox rates in $O_2$, even after prolonged exposure to $H_2O$ and $CO_2$ during cycling. Further, although contaminants such as $CO_2$ and $H_2O$ clearly decreased the reaction rate of the test sample relative to its rate in pure oxygen, the sample was not irreversibly "poisoned" by the contaminants. This is evident from the fact that the final measurement in pure oxygen after about 594 hours yielded loadings equal to or greater than the initial data in pure oxygen. The data in Table II were obtained with an oxide containing 80.8 mole % Pr. Other data show that examples containing less praseodymium, such as, for example, 76 mole % Pr, are less susceptible to the inhibition of redox rates by $CO_2$ and $H_2O$.

TABLE II

REDOX DATA FOR ISOTHERMAL CYCLING OF Pr-Ce OXIDE MASS IN PURE OXYGEN AND VARIOUS COMPOSITIONS OF CONTAMINATED OXYGEN

Temperature - 420°C
Mass Composition - 80.8 mole %
Pressure range - 0.2 – 1.0 atm.
Pure Oxygen is defined as anhydrous and $CO_2$ free compressed gas

| No. of Cycles | Total Elapsed Cycle Time in Hours | Oxygen Purity | wt.-% Oxygen Loading in 2.5 Min. |
|---|---|---|---|
| 0 –2227 | 185.6 hrs. | pure oxygen | 0.67 |
| 2228 – 3955 | 329.6 | $O_2$ + 2000 ppm $CO_2$ | 0.52 |
| 3956 – 4568 | 380.6 | pure oxygen | 0.69 |
| 4569 – 5131 | 427.6 | $O_2$ + 20 Torr $H_2O$ | 0.51 |
| 5132 – 5970 | 497.5 | pure oxygen | 0.71 |
| 5971 – 6839 | 569.9 | $O_2$ + 2000 ppm $CO_2$ + 20 Torr $H_2O$ | 0.20 |
| 6840 – 7130 | 594.2 | pure oxygen | 0.71 |

For reactant materials containing relatively large amounts of praseodymium, the adverse affects of $CO_2$ and $H_2O$ on reaction kinetics may be substantially eliminated by including minor amounts of a dopant, such as, silver in the Pr-Ce oxide composition. The presence of Ag surprisingly improves the oxides resistance to $CO_2$ and $H_2O$ to the extent that its rate of reaction is substantially the same with pure oxygen as with an oxidant mixture containing $H_2O$ and $CO_2$ in amounts far greater than ordinarily found in ambient air. Consequently, an air separation process could be effectively carried out using a Ag-doped oxide of the present invention as an exchange material, without the need for an initial scrubbing step to remove $CO_2$ and $H_2O$ from the air stream entering the reactor bed.

Although the exact mechanism by which $CO_2$ and $H_2O$ affect the reaction rate is not definitely known, it is believed to be due to the adsorption of these species on the surface of the reactant. Thus, when $CO_2$ and $H_2O$ are present, oxygen must compete with them for surface sites in the initial stages of oxidation and the final stage of dissociation. Consequently, the overall redox rates are retarded. The effects of the contaminants may be mitigated in several ways. For fixed oxygen pressures, reactants containing relatively small amounts of praseodymium are likely to be redox cycled at higher temperatures, where the adsorptive capacities of $CO_2$ and $H_2O$ will be less. Most importantly, the surface composition can be changed to decrease the adsorptive capacities for $CO_2$ and $H_2O$ or to provide alternate paths for adsorbing or desorbing oxygen. Doping is an effective way to alter surface composition without inducing extreme changes in the bulk properties. The species suitable for doping are believed to be those that, in oxide hosts, enhance recombination of monatomic oxygen species or catalytic oxidation. Although silver is the preferred species, transition metal elements such as vanadium, manganese, copper, molybdenum, tungsten, and platinum, and nontransition elements such as thallium, lead, and bismuth are also effective for this purpose.

To test resistance of silver doped Pr-Ce oxides to the effects of $CO_2$ and $H_2O$, three test samples were prepared identically except for the silver concentration and the calcination temperature. The one undoped sample was calcined at 900°C; the remaining two, containing 0.2 and 0.4 weight percent Ag, respectfully, were calcined at 750°C. All samples were cycled isothermally with pure $O_2$ and with a mixture of $O_2$, $CO_2$ and $H_2O$. Redox rates were measured for each gas composition after numerous cycles by allowing each reaction to go to completion. Values for the full range and oxygen loadings after 1 and 2 minutes are shown in Table III below. As can be seen, the values for the full range were not affected by contaminants, even in the undoped sample. However, the severe drop in OL1 and OL2 experienced by the undoped sample in the presence of $CO_2$ and $H_2O$, was markedly decreased in the sample containing 0.2 wt.-% Ag and entirely eliminated in the sample containing 0.4 wt.-% Ag. In short, the silver doping procedure renders the oxide materials insensitive, for all practical purposes, to the effects of contaminants in the air.

TABLE III

Effects of $H_2O$ and $CO_2$ on Redox Rates for Silver Doped and Undoped Pr-Ce Oxide Containing 80.8 mole % Pr at Sample Temperature: 420°C Isotherm

| Sample No. | Ag Content (wt.-%) | Gas Composition | $O_2$ Loading (Wt-%) Between 1.0 and 0.2 Atm. | | | | |
|---|---|---|---|---|---|---|---|
| | | | Full Range | In 1st Min. | | In 2 Min. | |
| | | | | Oxidn | Dissoc. | Oxidn. | Dissoc. |
| A | 0 | Pure $O_2$ | 0.95 | 0.45 | 0.41 | 0.62 | 0.65 |
| | | Contaminated $O_2$ * | 0.95 | 0.25 | 0.13 | 0.39 | 0.24 |
| B | 0.2 | Pure $O_2$ | 0.67 | 0.34 | 0.50 | 0.41 | 0.60 |
| | | Contaminated $O_2$ * | 0.64 | 0.32 | 0.40 | 0.41 | 0.55 |
| C | 0.4 | Pure $O_2$ | 0.62 | 0.37 | .54 | 0.45 | 0.59 |
| | | Contaminated $O_2$ * | 0.64 | 0.36 | 0.50 | 0.47 | 0.59 |

*Contaminated $O_2$ comprises $O_2$ + 948 ppm $CO_2$ + 20 torr $H_2O$ vapor

The optimum concentration of Ag or other dopant materials in the Pr-Ce oxide material will vary depending upon the composition of the oxygen containing gas mixture, namely, the nature and concentration of the contaminants. For a gas mixture containing up to approximately 1,000 ppm of $CO_2$ (as shown in Table III) a concentration of about 0.4 wt.-% Ag will be effective. For different gas compositions containing $H_2O$ and/or $CO_2$ in substantially greater or lesser amounts the optimum Ag concentration can be readily determined by simple experimentation.

PREPARATION OF A Ag-DOPED Pr-Ce OXIDE

The general method of preparing an oxide of praseodymium and cerium in accordance with the invention involves two steps: coprecipitation of insoluble salts and conversion of these to oxides. In the following example, the preparation of a Ag-doped oxide is described, but it should be understood that the method is applicable to other dopant species whose ions are too large to occupy lattice sites so that they will be concentrated near crystal surfaces, and to undoped materials as well. The specific material desired was an oxide containing 80 mole-% Pr and a small amount of Ag ($\leq$ 3 mole-% of the lanthanides).

The first step in the method consisted of preparing two aqueous solutions from de-ionized water. One solution was prepared by dissolving 40.0034 g of $Pr(NO_3)_3 \cdot 6 H_2O$, 10.0390 g of $Ce(NO_3)_3 \cdot 6 H_2O$, and 0.5874 g of $AgNO_3$ in 200 cc of $H_2O$. Another solution was prepared by dissolving 25.0 g of $(NH_4)_2 CO_3$ in 400 cc of $H_2O$.

The solution of nitrates was then added dropwise to the carbonate solution to coprecipitate the basic carbonates. The mixture was stirred continuously throughout the addition. The precipitate was separated from the mother liquor by filtration through porous glass, using a partial vacuum from a water aspirator. The precipitate was then washed with de-ionized water, most of the liquid being thereafter removed by pumping with an aspirator. The precipitate was then dried in an oven for 16 hr. at 110°C.

In the second step of the preparation, the dried carbonate lumps were crushed to powder by light grinding prior to calcination. This material was then converted to oxide by calcining in air in a furnace for 2 hr. at 750°C. During this time, the powder was removed from the furnace several times just long enough to mix it; then it was returned to the furnace while still hot.

Chemical analyses of the product showed it to contain: 65.1% Pr, 15.5% Ce, 0.4% Ag, 0.10% C, and 0.05% H, expressed as weight percent of the elements in the product oxide. Thus, the Pr content was 80.8 mole % and the Ag content was 0.6 mole %, expressed as moles Ag/(moles Pr + moles Ce). Both the oxidized and dissociated phases of Pr-Ce oxides were observed in the x-ray diffraction pattern of the product but there was no evidence of either Ag metal or Ag oxide phases. The specific surface area was found to be 8.2 $m^2/g$.

AIR SEPARATION

As previously mentioned, the Pr-Ce oxides described herein are particularly useful for the separation of oxygen from an oxygen containing gas mixture such as air. The steps required for such a process consist, basically, of first contacting the oxygen containing gas mixture with a reaction mass of the present invention at such temperatures and pressures that the equilibrium driving force will cause oxidation of at least a portion of the mass, thereafter the oxygen-depleted gas mixture is separated from the oxidized reaction mass, and the reaction mass then dissociated to liberate the oxygen. The liberated oxygen is then separated from the reduced reactant and the cycle repeated.

It will be apparent to those skilled in the art that a large variety of specific techniques may be used for accomplishing the above separation of oxygen from air. Thus, the solid reaction mass may be composed of a stationary bed, and the conditions surrounding the bed cyclically varied. Alternatively, the reaction mass may be transported through alternating oxidation and reduction zones.

If a static bed of a reaction mass is used, cycling may be accomplished by varying the temperature, pressure, or both in order to cause oxidation and reduction of the reaction mass. It should also be apparent that the cycling may be carried out without driving the entire reaction mass to the completely oxidized phase during the oxidation step, or completely to the dissociated phase during the reduction step. That is, cycling may be done so as to conduct the reaction between convenient pressures and temperatures in such a way as to maximize the oxygen loading for the energy required to drive the reaction. Furthermore, a plurality of reactors may be used in combination in order to make the process continuous. That is, one reactor may be in the oxidation stage while a second is in the reduction stage. Thereafter, the cycles are reversed in each reactor. Since the oxidation rate and the reduction rate need not proceed at the same absolute rate for an optimized process, it may also be desirable to use, for example, one reactor for oxidation and two reactors for dissociation.

In addition to the use of static bed reactors, the reaction masses of the present invention may readily be adapted to a fluidized bed process wherein the reaction mass is transported alternately through oxidation and reduction zones. The fluidized medium may be either gaseous or liquid, and include inert solids as well.

The properties of a reaction mass based on the Pr-Ce-O system can be adjusted to some extent to fit process requirements by changing the relative amounts of Pr and Ce. In contrast to other chemical air separation masses based on single substances or pairs of compounds, the oxides of praseodymium and cerium possess a range of thermodynamic and kinetic properties, hence an optimum reactant may be chosen depending upon process design parameters.

EXAMPLE OF A CHEMICAL AIR SEPARATION PROCESS

The following example is illustrative of the operation of an air separation process using a Pr-Ce oxide reactant of the present invention. Oxygen may be separated from air in a pressure swing cycle conducted in apparatus as shown in FIG. 3. For purposes of the example, the process steps are described in terms of a reactant mass containing 80 mole % Pr. With this reaction composition, an equilibrium oxygen loading of for example, 0.9 wt.-% can be obtained at 425°C between the oxygen pressures of 1.0 atm. (reactant oxidized) and 0.2 atm. (reactant dissociated). Thus, during oxidation air at a pressure in excess of 5.0 atm. will be used, and during dissociation oxygen will be pumped off at pressures less than 0.2 atm.

Referring to FIG. 3, fixed-bed reactor 1 is shown having gas inlet and outlet valves 2 and 3, respectively. During the oxidation stage, air is supplied to the inlet end of reactor 1 through compressor 9, preheater 4 and inlet valve 2. The product gas exits at the discharge end of reactor 1 through valves 3, 5 and 7. Valve 5, a throttle valve suitably controlled to maintain the desired pressure in reactor 1, is vented to the atmosphere. Vacuum pump 6 communicates with reactor 1 through product cooler 8 and valves 3 and 7.

During the air feed (oxidation stage) of the pressure swing cycle, valve 2 is opened, valve 3 closed and the inlet air is pressurized in compressor 9 and heated to 425°C in preheater 4. Valve 7 is then closed, valves 3 and 5 are opened and the feed air at, for example, 6.5 atm. pressure passed through reactor 1 until the reactant mass is partially oxidized. The oxygen depleted air is meanwhile vented to the atmosphere through throttle valve 5. At the end of the oxidation step, valve 2 is closed to isolate the reactant mass from the inlet feed and the reactant is then ready for dissociation.

Dissociation is initiated by depressurizing the reactor from 6.5 atm. to about 1 atm. through valve 5 so as to remove the nitrogen-rich gas from the void volume in reactor 1. Valve 5 is then closed, valve 7 opened, and oxygen-rich product is then taken off by dissociating the partially oxidized reactant. This is accomplished by pumping the oxygen-rich gas through product cooler 8 with vacuum pump 6 until the pressure in reactor 1 is decreased to 0.2 atm. Valve 3 is then closed, valve 2 opened and the system is then ready, once again, to begin the oxidation cycle.

While use of the Pr-Ce oxides of the present invention have been described above primarily as they relate to a flow-type air separation process for the manufacture of oxygen, it will be evident to those skilled in the art that the oxide reaction mass may also be used as a source of stored oxygen which can be liberated at will. Thus, an oxide of praseodymium and cerium may be used as a "one-shot" oxygen source of decomposition, or it may be used as the oxygen carrier in a rechargeable oxygen source system, for example, in a self-contained, portable breathing oxygen unit.

What is claimed is:

1. A process for separating oxygen from an oxygen-containing gas mixture comprising the steps of:

1. oxidizing a reaction mass comprising a praseodymium-cerium oxide in a dissociated state containing about 33–92 mole % Pr by contacting it with said oxygen containing gas mixture thereby converting at least a portion of said reaction mass to a relatively more oxidized state,
2. separating the oxidized reaction mass from the oxygen-depleted gas mixture,
3. dissociating at least a portion of said oxidized reaction mass to form a relatively more reduced state of praseodymium-cerium oxide, thereby liberating oxygen, and
4. separating said liberated oxygen from said reduced state of praseodymium-cerium oxide.

2. The process as in claim 1 wherein said oxide contains at least one dopant selected from the group consisting of silver, vanadium, manganese, copper, molybdenum, tungsten, platinum, thallium, lead and bismuth.

3. The process as in claim 2 wherein said dopant is silver.

4. The process of claim 1 wherein said oxygen-containing gas mixture is air.

5. The process of claim 1 wherein the recited steps (1) to (4) are repeated in cyclic fashion.

6. The process of claim 1 wherein the reaction mass is in the form of a static bed.

7. The process of claim 1 wherein the reaction mass is transported alternately through oxidation and reduction zones.

8. A reaction mass comprising a non-stoichiometric oxide solid solution of praseodymium and cerium containing about 33–92 mole % Pr having the general formula:

$$(Pr_xCe_y)O_z$$

where:
the sum of $x$ and $y$ equals 1.0, and $z$ varies from 1.5 to 2.0
and containing at least one surface dopant selected from the group consisting of silver, vanadium, manganese, copper, molybdenum, tungsten, platinum, thallium, lead and bismuth.

9. The reaction mass of claim 8 wherein said dopant is silver.

10. The reaction mass of claim 9 wherein the amount of silver dopant is about 0.4 wt.-% based on the weight of the oxide.

11. The reaction mass of claim 9 wherein said oxide contains from about 67–92 mole % Pr.

* * * * *